United States Patent
Kitayama

(10) Patent No.: US 10,715,305 B2
(45) Date of Patent: Jul. 14, 2020

(54) IMAGE FORMING APPARATUS PERFORMING WIRELESS COMMUNICATION WITH REPLACEMENT MEMBER, AND COMMUNICATION METHOD

(71) Applicant: KYOCERA Document Solutions Inc., Osaka-shi, Osaka (JP)

(72) Inventor: Kaori Kitayama, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 350 days.

(21) Appl. No.: 15/716,986

(22) Filed: Sep. 27, 2017

(65) Prior Publication Data

US 2018/0091701 A1 Mar. 29, 2018

(30) Foreign Application Priority Data

Sep. 29, 2016 (JP) ................. 2016-190756

(51) Int. Cl.
*H04L 7/00* (2006.01)
*H04L 1/16* (2006.01)
(Continued)

(52) U.S. Cl.
CPC ............ *H04L 7/00* (2013.01); *G06F 11/0793* (2013.01); *G06F 11/1004* (2013.01);
(Continued)

(58) Field of Classification Search
None
See application file for complete search history.

(56) References Cited

U.S. PATENT DOCUMENTS

| 4,031,317 A * | 6/1977 | McClain | H03L 7/0993 |
| | | | 375/358 |
| 7,650,388 B2 * | 1/2010 | Rodriguez | H04L 1/188 |
| | | | 709/213 |

(Continued)

FOREIGN PATENT DOCUMENTS

JP 2009198563 A 9/2009

*Primary Examiner* — Walter L Lindsay, Jr.
*Assistant Examiner* — Geoffrey T Evans
(74) *Attorney, Agent, or Firm* — Alleman Hall Creasman & Tuttle LLP

(57) ABSTRACT

An image forming apparatus includes a wireless communication portion, a transmission processing portion, a decoding processing portion, a change processing portion, and a retransmission processing portion. The wireless communication portion has a storage portion that stores member data regarding a replacement member. The transmission processing portion is configured to transmit a transmission request for transmitting the member data to the wireless communication portion. The decoding processing portion is configured to decode a response signal including the member data and transmitted from the wireless communication portion in response to the transmission request. The change processing portion is configured to change a decoding timing of the response signal when it has been determined that reception of the member data has failed. The retransmission processing portion is configured to retransmit the transmission request to the wireless communication portion after the decoding timing has been changed.

8 Claims, 5 Drawing Sheets

(51) Int. Cl.
  *G06F 11/07* (2006.01)
  *G06F 11/14* (2006.01)
  *H04L 1/08* (2006.01)
  *G06F 11/10* (2006.01)
  *H04L 1/18* (2006.01)

(52) U.S. Cl.
  CPC ............ *G06F 11/1443* (2013.01); *H04L 1/08* (2013.01); *H04L 1/1678* (2013.01); *H04L 1/1816* (2013.01)

(56) References Cited

U.S. PATENT DOCUMENTS

| | | | |
|---|---|---|---|
| 2005/0259754 A1* | 11/2005 | Ho | H04N 21/8547 375/240.28 |
| 2009/0150537 A1* | 6/2009 | Fanson | H04L 47/822 709/224 |
| 2013/0259108 A1* | 10/2013 | Baba | H04L 1/0042 375/226 |
| 2014/0029408 A1* | 1/2014 | Yamamoto | H04L 1/1867 370/216 |
| 2015/0051914 A1* | 2/2015 | Andersson | H03M 5/12 704/500 |

* cited by examiner

IMAGE FORMING APPARATUS PERFORMING WIRELESS COMMUNICATION WITH REPLACEMENT MEMBER, AND COMMUNICATION METHOD

INCORPORATION BY REFERENCE

This application is based upon and claims the benefit of priority from the corresponding Japanese Patent Application No. 2016-190756 filed on Sep. 29, 2016, the entire contents of which are incorporated herein by reference.

BACKGROUND

The present disclosure relates to an image forming apparatus, and a communication method executed in the image forming apparatus.

In some electrophotographic type image forming apparatuses, a wireless communication portion such as IC tag is provided to a replacement member such as toner container. In this type of image forming apparatus, the operation of the image forming apparatus is controlled on the basis of member data, such as identification information of a replacement member, which is received from the wireless communication portion.

For example, in the image forming apparatus, the member data is received from the wireless communication portion in the following procedure. First, the wireless communication portion is activated in response to radiation of a radio wave from the antenna of the image forming apparatus toward the wireless communication portion. Next, a transmission request for transmitting the member data is transmitted to the wireless communication portion. Next, in response to the transmission request, a response signal that includes the member data and that has been encoded at a predetermined bit period is transmitted from the wireless communication portion. Then, the response signal received from the wireless communication portion is decoded, whereby the member data is acquired. For example, the response signal is decoded at a predetermined timing in the bit period.

SUMMARY

An image forming apparatus according to one aspect of the present disclosure includes an antenna, a wireless communication portion, a transmission processing portion, a decoding processing portion, a determination processing portion, a change processing portion, and a retransmission processing portion. The antenna is configured to be able to transmit and receive a radio signal. The wireless communication portion has a storage portion that stores member data regarding a replacement member attachable to and detachable from the image forming apparatus, is provided to the replacement member, and is configured to be activated in response to radiation of a radio wave from the antenna and perform wireless communication. The transmission processing portion is configured to transmit a transmission request for transmitting the member data to the wireless communication portion, by using the antenna. The decoding processing portion is configured to decode, at a predetermined reference timing in a predetermined bit period, a response signal that is transmitted from the wireless communication portion to the antenna in response to the transmission request and that includes the member data and has been encoded at the predetermined bit period. The determination processing portion is configured to determine success or failure of reception of the member data on the basis of the response signal that has been decoded by the decoding processing portion. The change processing portion is configured to change a decoding timing of the response signal to be decoded by the decoding processing portion when the determination processing portion has determined that reception of the member data has failed. The retransmission processing portion is configured to retransmit the transmission request to the wireless communication portion when the decoding timing has been changed by the change processing portion.

A communication method according to another aspect of the present disclosure is executed by an image forming apparatus that includes an antenna configured to be able to transmit and receive a radio signal, and a wireless communication portion having a storage portion that stores member data regarding a replacement member attachable to and detachable from the image forming apparatus, the wireless communication portion being provided to the replacement member, the wireless communication portion being configured to be activated in response to radiation of a radio wave from the antenna and perform wireless communication, the communication method including a transmission step, a decoding step, a determination step, a change step, and a retransmission step. In the transmission step, a transmission request for transmitting the member data is transmitted to the wireless communication portion, by using the antenna. In the decoding step, a response signal that is transmitted from the wireless communication portion to the antenna in response to the transmission request and that includes the member data and has been encoded at a predetermined bit period, is decoded at a predetermined reference timing in the bit period. In the determination step, success of failure of reception of the member data is determined on the basis of the response signal that has been decoded in the decoding step. In the change step, the decoding timing of the response signal in the decoding step is changed when it has been determined in the determination step that reception of the member data has failed. In the retransmission step, the transmission request is retransmitted to the wireless communication portion when the decoding timing has been changed in the change step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings in order to allow understanding of the present disclosure. The following embodiment is an example embodying the present disclosure and does not limit the technical scope of the present disclosure.

[Schematic Structure of Image Forming Apparatus 10]

First, a schematic structure of an image forming apparatus 10 according to an embodiment of the present disclosure will be described with reference to FIGS. 1 and 2. Here, FIG. 1 is a cross-sectional schematic diagram showing the structure of the image forming apparatus 10.

The image forming apparatus 10 is a multifunction peripheral having a plurality of functions such as a facsimile function and a copy function as well as a scan function of reading image data from a document and a print function of forming an image on the basis of image data. The present disclosure is applicable to image forming apparatuses such as a printer apparatus, a facsimile apparatus, and a copy machine.

Figure 1:
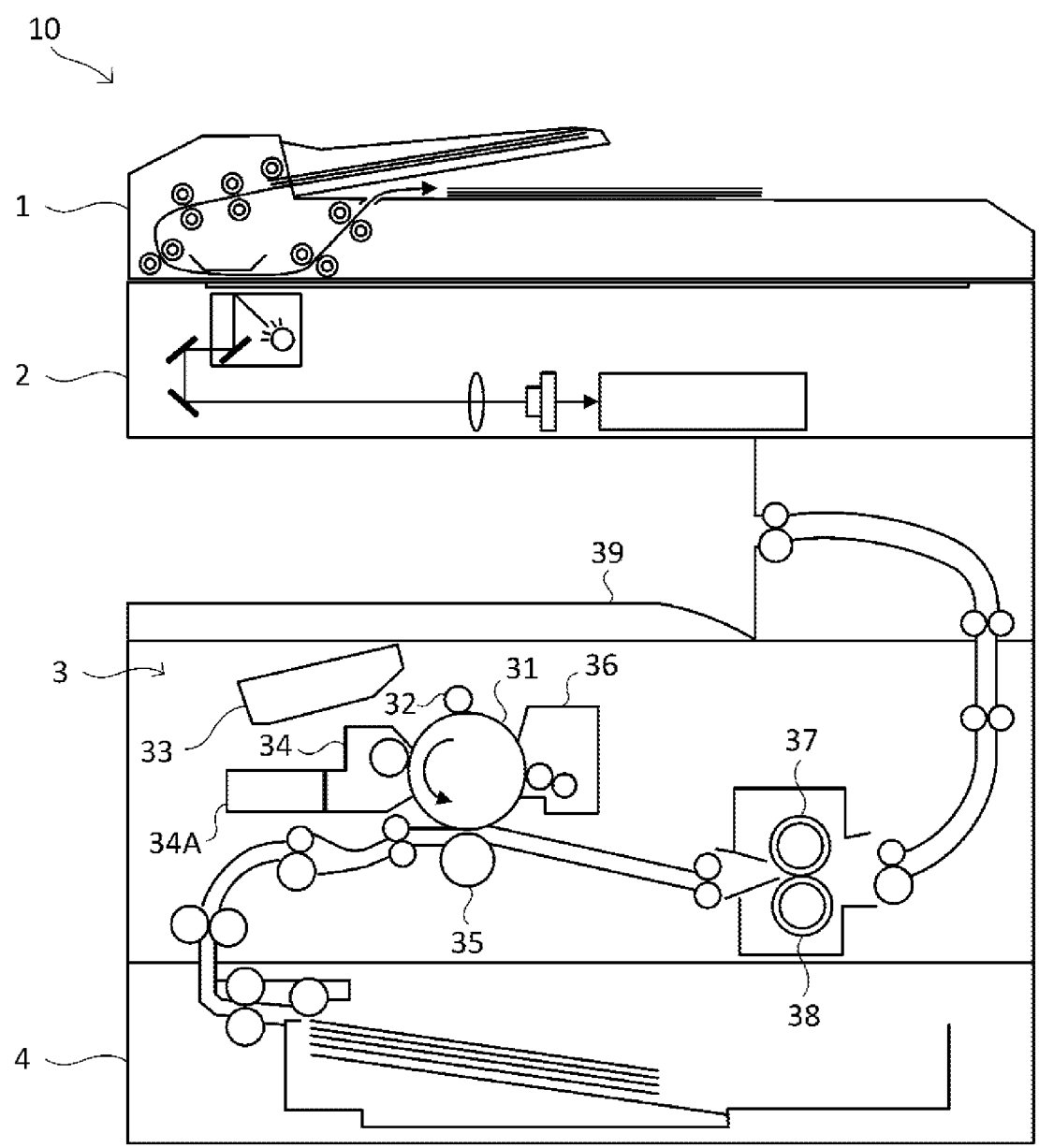
FIG. 1 is a diagram showing a structure of an image forming apparatus according to an embodiment of the present disclosure.
Figure 2:
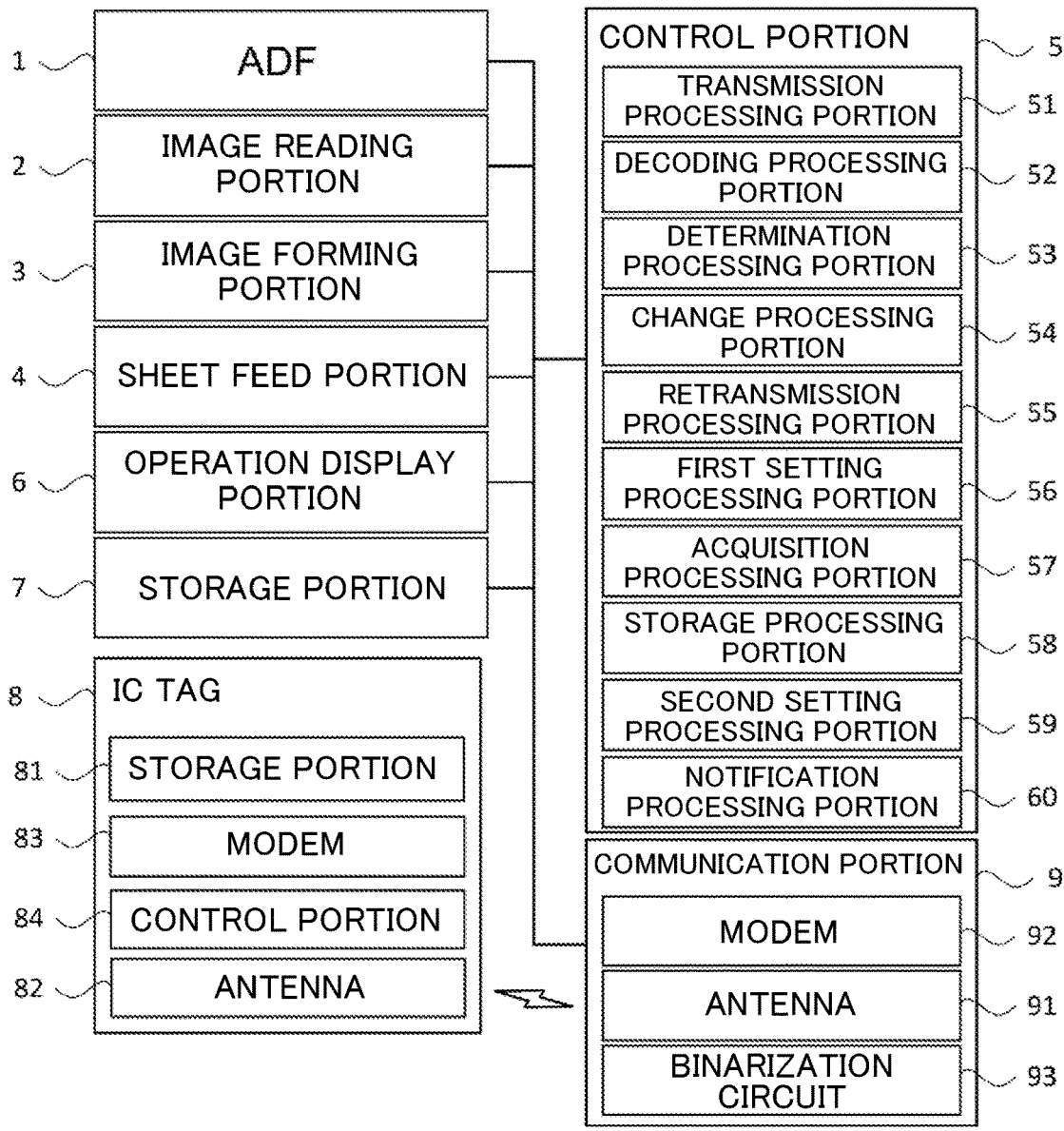
FIG. 2 is a block diagram showing a system configuration of the image forming apparatus according to the embodiment of the present disclosure.

As shown in FIGS. 1 and 2, the image forming apparatus 10 includes an ADF 1, an image reading portion 2, an image forming portion 3, a sheet feed portion 4, a control portion 5, an operation display portion 6, a storage portion 7, an IC tag 8, and a communication portion 9.

The ADF 1 is an automatic document feeder that includes a document set portion, a plurality of conveyance rollers, a document holder, and a sheet discharge portion and that conveys a document to be read by the image reading portion 2.

The image reading portion 2 includes a document table, a light source, a plurality of mirrors, an optical lens, and a charge coupled device (CCD), and is able to read a document from image data.

The image forming portion 3 is able to execute an image forming processing (printing processing) of forming an image by using toner on the basis of image data read by the image reading portion 2. The image forming portion 3 is also able to execute the printing processing on the basis of image data inputted from an external information processing apparatus such as a personal computer. Specifically, as shown in FIG. 1, the image forming portion 3 includes a photosensitive drum 31, a charging device 32, a laser scanning unit 33, a developing device 34, a toner container 34A, a transfer roller 35, a cleaning device 36, a fixing roller 37, a pressure roller 38, and a sheet discharge tray 39.

The sheet feed portion 4 includes a sheet feed cassette and a plurality of conveyance rollers, and feeds the sheet stored in the sheet feed cassette to the image forming portion 3. The sheet stored in the sheet feed cassette is a sheet material such as paper, coated paper, a postcard, an envelope, or an OHP sheet.

In the image forming portion 3, an image is formed on the sheet fed from the sheet feed portion 4 in the following procedure, and the sheet having an image formed thereon is discharged to the sheet discharge tray 39.

First, the surface of the photosensitive drum 31 is charged uniformly at a predetermined potential by the charging device 32. Next, the surface of the photosensitive drum 31 is irradiated with light based on image data by the laser scanning unit 33. Thus, an electrostatic latent image that corresponds to the image data is formed on the surface of the photosensitive drum 31. The electrostatic latent image on the photosensitive drum 31 is developed (visualized) as a toner image by the developing device 34. The toner (developer) is supplied to the developing device 34 from the toner container 34A (an example of a toner containing portion in the present disclosure) which is detachably provided to the image forming portion 3 and which contains toner.

Next, the toner image formed on the photosensitive drum 31 is transferred onto the sheet by the transfer roller 35. Thereafter, the toner image transferred onto the sheet is melted and fixed by being heated by the fixing roller 37 when the sheet passes between the fixing roller 37 and the pressure roller 38. The toner remaining on the surface of the photosensitive drum 31 is removed by the cleaning device 36.

The control portion 5 includes control devices such as a CPU, a ROM, a RAM, and an EEPROM (not shown). The CPU is a processor that executes various operational processes. The ROM is a nonvolatile storage device in which information such as a control program for causing the CPU to execute various processes is stored in advance. The RAM is a volatile storage device used as a temporary storage memory (working area) for various processes to be executed by the CPU. The EEPROM is a nonvolatile storage device. In the control portion 5, various control programs stored in advance in the ROM are executed by the CPU. Thus, the image forming apparatus 10 is comprehensively controlled by the control portion 5. It is noted that the control portion 5 may be configured from an electronic circuit such as an integrated circuit (ASIC), or may be a control portion provided separately from a main control portion for comprehensively controlling the image forming apparatus 10.

The operation display portion 6 has: a display portion, such as a liquid crystal display, which displays various kinds of information in accordance with control instructions from the control portion 5; and an operation portion, such as an operation key or a touch panel, which inputs various kinds of information to the control portion 5 in accordance with operations by a user.

The storage portion 7 is a nonvolatile storage device such as a hard disk drive or a flash memory. The storage portion 7 may be the EEPROM of the control portion 5.

[Configurations of IC Tag 8 and Communication Portion 9]

Figure 3:
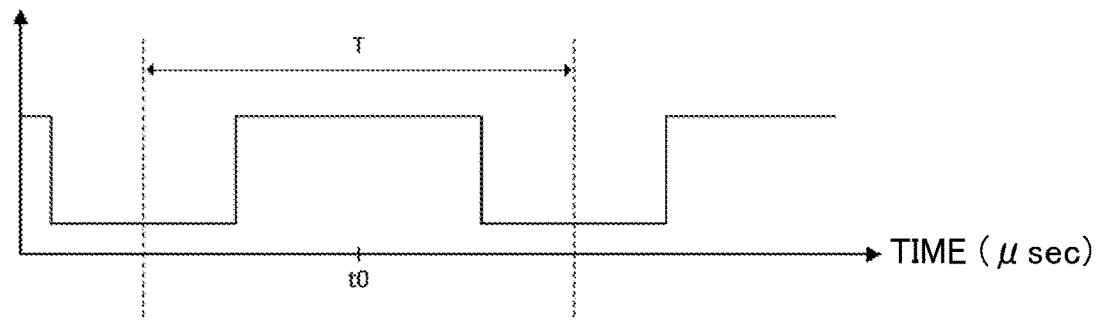
FIG. 3 is a graph showing an example of a response signal transmitted from an IC tag of the image forming apparatus according to the embodiment of the present disclosure.

Next, the IC tag 8 and the communication portion 9 will be described with reference to FIGS. 2 and 3. FIG. 3 is a graph showing a response signal, of the IC tag 8, inputted to the control portion 5.

The IC tag 8 is provided to the toner container 34A, is activated in response to the radiation of a radio wave from an antenna 91 of the communication portion 9, and executes wireless data communication with the communication portion 9. Here, the IC tag 8 is an example of a wireless communication portion in the present disclosure. In addition, the toner container 34A is an example of a replacement member in the present disclosure. The replacement member in the present disclosure may be a drum unit that includes a photosensitive drum 31 detachably provided to the image forming portion 3, or the like.

As shown in FIG. 2, the IC tag 8 includes a storage portion 81, an antenna 82, a modem 83, and a control portion 84.

The storage portion 81 stores member data regarding the toner container 34A. The member data includes identification information of the toner container 34A and toner remaining amount information in the toner container 34A. For example, the image forming apparatus 10 determines whether or not to restrict attachment or detachment of the toner container 34A by using a locking mechanism (not shown) capable of restricting attachment or detachment of the toner container 34A, on the basis of the identification information read from the storage portion 81. In addition, the image forming apparatus 10 determines a notification timing for a message requesting replacement of the toner container 34A, on the basis of the remaining amount information read from the storage portion 81.

The antenna 82 is able to transmit and receive a radio signal to and from the communication portion 9. The modem 83 is able to modulate a transmission signal to be transmitted to the communication portion 9 by a predetermined modulation method such as amplitude modulation. In addition, the modem 83 is able to demodulate a reception signal received from the communication portion 9, by the modulation method.

The control portion 84 includes control devices such as a CPU, a ROM, and a RAM (not shown), and controls operation of the IC tag 8. The control portion 84 is activated by power supplied from the communication portion 9 via a radio wave.

When data is transmitted to the communication portion 9, the control portion 84 encodes transmission data so as to convert the transmission data into a transmission signal. Specifically, as shown in FIG. 3, the control portion 84 encodes the transmission data to be transmitted to the communication portion 9, at a predetermined bit period (sampling period) T, on the basis of a non-zero recovery (NRZ) encoding method. For example, the bit period T is 37 microseconds. The transmission signal converted by the control portion 84 is modulated in the modem 83, and then the modulated signal is transmitted by the antenna 82. In the NRZ encoding method, bit data indicating "0" is converted into an electric signal of low level, and bit data indicating "1" is converted into an electric signal of high level.

When data is received from the communication portion 9, the control portion 84 decodes a reception signal that has been received by the antenna 82 and that has been demodulated by the modem 83, so as to convert the reception signal into reception data. Specifically, the control portion 84 decodes, at the bit period T, a reception signal inputted from the modem 83 on the basis of the NRZ encoding method.

When the reception signal received from the communication portion 9 has been decoded and converted into reception data, the control portion 84 determines success or failure of data reception on the basis of data for error detection, such as CRC, which is included in the reception data. When it is determined that the data reception has failed, the control portion 84 notifies the communication portion 9 of the failure. When it is determined that the data reception is successful, the control portion 84 causes the storage portion 81 to store the reception data therein.

The communication portion 9 is a communication interface that is able to perform wireless communication with the IC tag 8. When the toner container 34A is mounted to the image forming portion 3, the communication portion 9 is provided at a position opposing the IC tag 8 of the toner container 34A. For example, the communication portion 9 includes an ASIC or an MPU that controls operation of the communication portion 9.

As shown in FIG. 2, the communication portion 9 includes the antenna 91 (an example of an antenna in the present disclosure), a modem 92, and a binarization circuit 93.

The antenna 91 is able to transmit and receive a radio signal to and from the IC tag 8. The modem 92 is able to modulate the transmission signal to be transmitted to the IC tag 8 by the modulation method. In addition, the modem 92 is able to demodulate the reception signal received from the IC tag 8 by the modulation method. The binarization circuit 93 binarizes the reception signal that has been received from the IC tag 8 and that has been demodulated by the modem 92, and then inputs the binarized reception signal to the control portion 5.

In the image forming apparatus 10, the member data is read from the IC tag 8 in the following procedure. First, the IC tag 8 is activated in response to radiation of a radio wave from the antenna 91 of the communication portion 9 toward the IC tag 8. Next, a transmission request for transmitting the member data is transmitted to the IC tag 8. Next, in response to the transmission request, a response signal (see FIG. 3) that includes the member data is transmitted from the IC tag 8. Next, the response signal received from the IC tag 8 is demodulated by the modem 92 and is binarized by the binarization circuit 93, and then the binarized response signal is inputted to the control portion 5. Then, the response signal is decoded in the control portion 5, whereby the member data is acquired.

Figure 4:
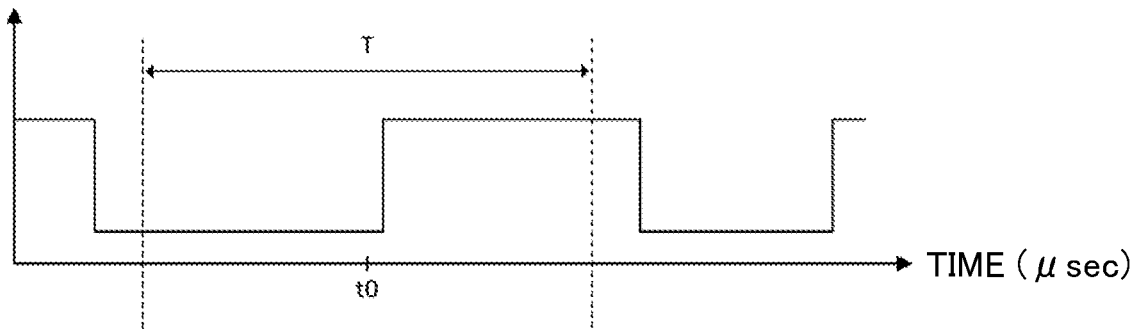
FIG. 4 is a graph showing an example of the response signal transmitted from the IC tag of the image forming apparatus according to the embodiment of the present disclosure.
Figure 5:
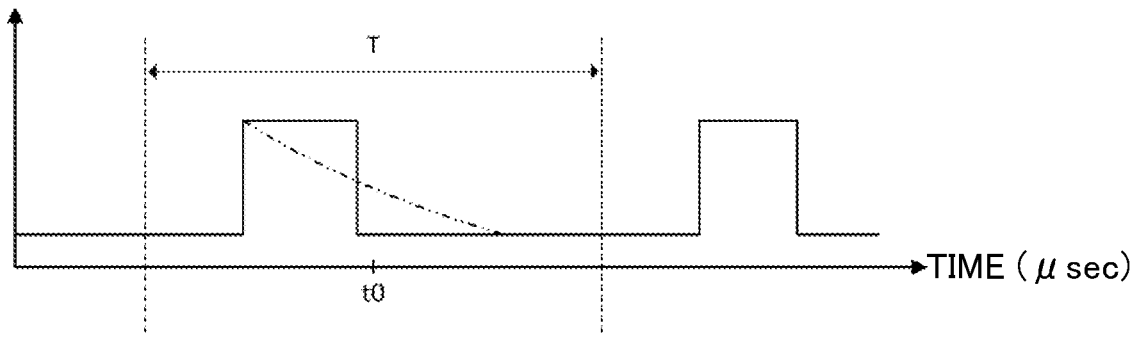
FIG. 5 is a graph showing an example of the response signal transmitted from the IC tag of the image forming apparatus according to the embodiment of the present disclosure.

Incidentally, the phase of the response signal in the bit period T may be shifted due to a separation distance between the IC tag 8 and the antenna 91 of the communication portion 9. For example, when the separation distance between the IC tag 8 and the antenna 91 of the communication portion 9 is large, as shown in FIG. 4, the phase of the response signal in the bit period T may be delayed. The pulse width of the response signal may be decreased due to an individual difference in radio-wave reception sensitivity of the IC tag 8. For example, in an IC tag 8 having a radio-wave reception sensitivity lower than other IC tags 8, a waveform of the response signal may be deformed (see two-dot dashed line in FIG. 5) due to the shortage of power necessary for transmitting the response data, and thus, as shown in FIG. 5, the pulse width of the binarized response signal to be inputted to the control portion 5 may be decreased.

When decoding of the response signal in the control portion 5 is executed at a predetermined fixed timing t0 (see FIGS. 4 and 5) in the bit period T, decoding of the response signal received from the IC tag 8 may fail, so that a reception error may occur in the image forming apparatus 10. Meanwhile, in the image forming apparatus 10 according to the embodiment of the present disclosure, as described later, it is possible to suppress occurrence of a reception error when the member data is received from the IC tag 8.

Specifically, the ROM of the control portion 5 stores in advance a data reception program for causing the CPU to execute a data reception process (see a flowchart of FIG. 7) and a decoding timing setting process (see a flowchart of FIG. 8), which will be described later. The data reception program may be stored in a non-transitory computer-readable storage medium such as a CD, a DVD, or a flash memory, and may be read from the storage medium so as to be installed into the EEPROM of the control portion 5, or the like.

As shown in FIG. 2, the control portion 5 includes a transmission processing portion 51, a decoding processing portion 52, a determination processing portion 53, a change processing portion 54, a retransmission processing portion 55, a first setting processing portion 56, an acquisition processing portion 57, a storage processing portion 58, a second setting processing portion 59, and a notification processing portion 60. Specifically, the control portion 5 executes the data reception program stored in the ROM, using the CPU. Thus, the control portion 5 functions as the transmission processing portion 51, the decoding processing portion 52, the determination processing portion 53, the change processing portion 54, the retransmission processing portion 55, the first setting processing portion 56, the acquisition processing portion 57, the storage processing portion 58, the second setting processing portion 59, and the notification processing portion 60.

The transmission processing portion 51 transmits a transmission request for transmitting the member data to the IC tag 8, by using the antenna 91 of the communication portion 9.

Specifically, the transmission processing portion 51 causes the antenna 91 of the communication portion 9 to radiate a radio wave, and activate the control portion 84 of the IC tag 8. Then, the transmission processing portion 51 encodes data indicating the transmission request, at the bit period T on the basis of the NRZ encoding method, and inputs the encoded data to the communication portion 9. In the communication portion 9, the inputted transmission request is modulated by the modem 92, and is transmitted to the IC tag 8 by the antenna 91.

The decoding processing portion 52 executes a decoding process of decoding, at a predetermined reference timing in the bit period T, the response signal that is transmitted from the IC tag 8 to the antenna 91 in response to the transmission request and that includes the member data and has been encoded at the bit period T. For example, the reference timing is the timing t0 (see FIGS. 3 to 5) at which the bit period T is divided into two equal parts.

For example, the IC tag 8 transmits the response signal to the communication portion 9 at the timing when a predetermined response time period has elapsed after the transmission request having been transmitted. The decoding processing portion 52 starts the decoding process at the timing when the response time period has elapsed after the transmission request having been transmitted.

The determination processing portion 53 determines success or failure of reception of the member data on the basis of the response signal that has been decoded by the decoding processing portion 52.

For example, the determination processing portion 53 determines success or failure of reception of the member data on the basis of data for error detection, such as CRC, which is included in the response signal that has been decoded by the decoding processing portion 52.

When the determination processing portion 53 has determined that reception of the member data has failed, the change processing portion 54 changes a decoding timing at which the response signal to be decoded by the decoding processing portion 52.

Figure 6:
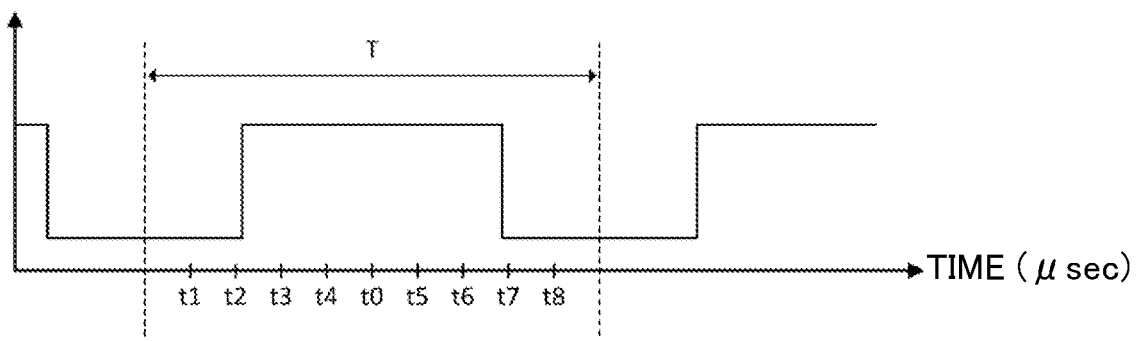
FIG. 6 is a graph showing an example of a provisional timing in the image forming apparatus according to the embodiment of the present disclosure.

For example, the change processing portion 54 alternately changes the decoding timing between a first timing that is earlier than the reference timing and a second timing that is later than the reference timing, every time the determination processing portion 53 determines that reception of the member data has failed. For example, the change processing portion 54 changes the decoding timing in order of timings t4, t5, t3, t6, t2, t7, t1, and then t8 shown in FIG. 6, every time the determination processing portion 53 determines that reception of the member data has failed.

The change processing portion 54 may advance or delay the decoding timing by a predetermined time, every time the determination processing portion 53 determines that reception of the member data has failed. The change processing portion 54 may change the decoding timing in a change procedure different from the above-described change procedure.

When the change processing portion 54 has changed the decoding timing, the retransmission processing portion 55 retransmits the transmission request to the IC tag 8.

When the determination processing portion 53 has determined that reception of the member data is successful after the change processing portion 54 has changed the decoding timing, the first setting processing portion 56 sets the decoding timing to the timing used when reception of the member data is successful.

The decoding processing portion 52 decodes the response signal at the decoding timing set by the first setting processing portion 56, until the determination processing portion 53 determines that reception of the member data has failed since the first setting processing portion 56 has set the decoding timing.

For example, in the image forming apparatus 10, the EEPROM of the control portion 5 ensures a first storage area used to set the decoding timing. For example, as an initially set value, the reference timing is stored in advance in the first storage area. When the determination processing portion 53 has determined that reception of the member data is successful after the change processing portion 54 has changed the decoding timing, the first setting processing portion 56 sets the decoding timing by storing the timing used when reception of the member data is successful, in an overwriting manner in the first storage area.

In the image forming apparatus 10, the control portion 5 may not include the first setting processing portion 56.

When a predetermined setting condition is satisfied, the acquisition processing portion 57 acquires, for each predetermined provisional timing in the bit period, a determination result by the determination processing portion 53 in a case where the decoding processing portion 52 decodes the response signal at the provisional timing. For example, the provisional timings are timings t0 to t8 (see FIG. 6), which are determined at predetermined time intervals in the bit period.

For example, the setting condition is that a number of times the determination processing portion 53 has determined that reception of the member data has failed is larger than a predetermined upper limit number of times. The setting condition may be that the determination processing portion 53 has determined that reception of the member data is successful after the change processing portion 54 has changed the decoding timing. The setting condition may be that a predetermined timing has arrived.

The storage processing portion 58 stores, in the storage portion 7, the determination results for the respective provisional timings, acquired by the acquisition processing portion 57. Here, the storage portion 7 is an example of a determination result storage portion in the present disclosure.

For example, in the image forming apparatus 10, the storage portion 7 ensures a second storage area used to store the determination results for the respective provisional timings, acquired by the acquisition processing portion 57. The storage processing portion 58 stores the acquired determination result for each provisional timing, in an overwriting manner in the second storage area, every time the acquisition processing portion 57 acquires the determination result for each provisional timing.

When the storage portion 7 stores the provisional timing that corresponds to the determination result indicating successful reception, the acquisition processing portion 57 acquires the determination result by the determination processing portion 53 for each provisional timing that corresponds to the determination result indicating successful reception and stored in the storage portion 7.

The second setting processing portion 59 sets the decoding timing on the basis of the provisional timing that corresponds to the determination result indicating successful reception among the determination results for the respective provisional timings, acquired by the acquisition processing portion 57.

The decoding processing portion 52 decodes the response signal at the decoding timing set by the second setting processing portion 59, until the determination processing portion 53 determines that reception of the member data has failed since the second setting processing portion 59 has set the decoding timing.

For example, when the acquisition processing portion 57 acquires determination results for the respective provisional timings, the second setting processing portion 59 sets the decoding timing by storing any of the provisional timings that correspond to the determination results indicating successful reception among the acquired determination results for the respective provisional timings in an overwriting manner in the first storage area. For example, when three or more provisional timings that correspond to the determination results indicating successful reception are present continuously in time, the second setting processing portion 59 stores one provisional timing that is present at a midpoint between the earliest provisional timing and the latest provisional timing, in an overwriting manner in the first storage area.

In the image forming apparatus 10, the control portion 5 may not include the acquisition processing portion 57, the storage processing portion 58, and the second setting processing portion 59. In the image forming apparatus 10, the control portion 5 may not be provided with the storage processing portion 58.

When the number of times the determination processing portion 53 has determined that reception of the member data has failed is larger than the upper limit number of times, the notification processing portion 60 provides notification regarding occurrence of a reception error. For example, the notification processing portion 60 provides notification by displaying a message indicating occurrence of a reception error on the operation display portion 6.

In the image forming apparatus 10, the control portion 5 may not include the notification processing portion 60.

[Data Reception Process]

Figure 7:
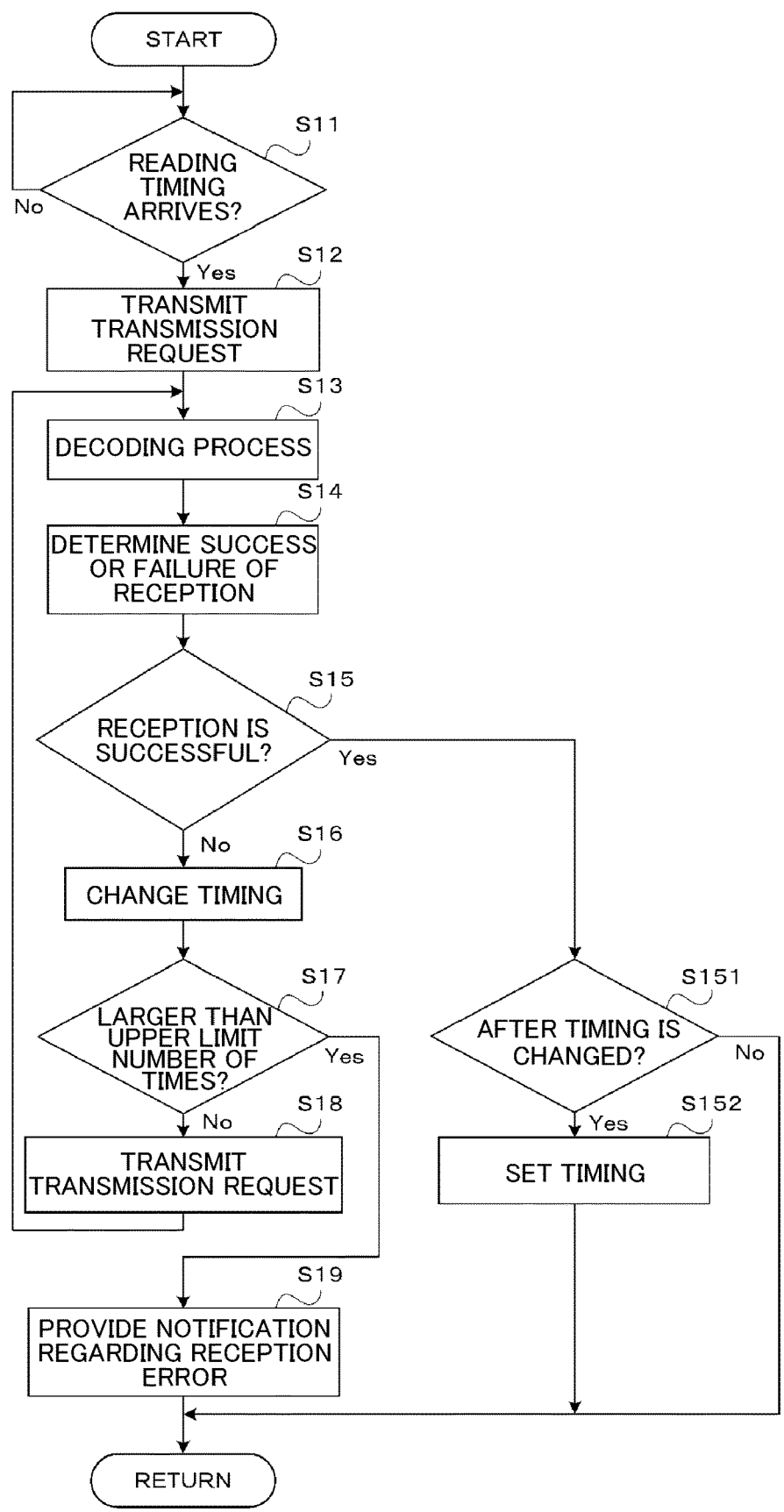
FIG. 7 is a flowchart showing an example of a data reception process executed in the image forming apparatus according to the embodiment of the present disclosure.

Hereinafter, an example of the procedure of a data reception process executed by the control portion 5 in the image forming apparatus 10 will be described with reference to FIG. 7. Here, steps S11, S12, . . . represent numbers of process procedures (steps) to be executed by the control portion 5.

<Step S11>

First, in step S11, the control portion 5 determines whether or not a reading timing of the member data has arrived. For example, the control portion 5 determines that the reading timing of the member data has arrived, when the image forming apparatus 10 is powered on and when the operation state of the image forming apparatus 10 is changed to a normal state from a sleep state in which a part of the function is stopped.

When the control portion 5 determines that the reading timing of the member data has arrived (Yes in S11), the control portion 5 advances the process to step S12. When the reading timing of the member data has not arrived yet (No in S11), the control portion 5 waits in step S11 for arrival of the reading timing of the member data.

<Step S12>

In step S12, the control portion 5 transmits the transmission request to the IC tag 8, by using the antenna 91 of the communication portion 9. Here, the process step of step S12 is an example of a transmission step in the present disclosure, and is executed by the transmission processing portion 51 of the control portion 5.

Specifically, the control portion 5 causes the antenna 91 of the communication portion 9 to radiate a radio wave, and activates the control portion 84 of the IC tag 8. Then, the control portion 5 encodes data indicating the transmission request at the bit period T on the basis of the NRZ encoding method, and inputs the encoded data to the communication portion 9. In the communication portion 9, the inputted transmission request is modulated by the modem 92, and is transmitted to the IC tag 8 by the antenna 91.

<Step S13>

In step S13, the control portion 5 executes the decoding process of decoding the response signal transmitted from the IC tag 8 to the antenna 91 in response to the transmission request that has been transmitted in step S12. Here, the process step of step S13 is an example of a decoding step in the present disclosure, and is executed by the decoding processing portion 52 of the control portion 5.

For example, the control portion 5 reads the timing (the decoding timing) stored in the first storage area of the EEPROM and executes the decoding process.

For example, the control portion 5 executes the decoding process at the timing when the response time period has elapsed after the transmission request having been transmitted. Thus, the response signal transmitted to the communication portion 9 is decoded at the timing when the response time period has elapsed after the transmission request having been transmitted.

<Step S14>

In step S14, the control portion 5 determines success or failure of reception of the member data on the basis of the response signal that has been decoded in step S13. Here, the process step of step S14 is an example of a determination step in the present disclosure, and is executed by the determination processing portion 53 of the control portion 5.

For example, the control portion 5 determines success or failure of reception of the member data on the basis of data for error detection, such as CRC, which is included in the response signal that has been decoded in step S13.

<Step S15>

In step S15, the control portion 5 determines whether or not reception of the member data has been determined to be successful in step S14.

If the control portion 5 determines that reception of the member data has been determined to be successful in step S14 (Yes in S15), the control portion 5 advances the process to step S151. On the other hand, the control portion 5 determines that reception of the member data has been determined to have failed in step S14 (No in S15), the control portion 5 advances the process to step S16.

<Step S16>

In step S16, the control portion 5 changes the decoding timing of the response signal. Here, the process step of step S16 is an example of a change step in the present disclosure, and is executed by the change processing portion 54 of the control portion 5.

For example, when the timing read in step S13 is the reference timing, the control portion 5 alternately changes the decoding timing between the first timing and the second timing, every time reception of the member data is determined to have failed in step S14. Thus, it is possible to adapt to both the case where the phase of the response signal in the bit period T is shifted due to a separation distance between the IC tag 8 and the antenna 91 of the communication portion 9 (see FIG. 4) and the case where the pulse width of the response signal is decreased due to an individual difference in radio-wave reception sensitivity of the IC tag 8 (see FIG. 5).

When the timing read in step S13 is a timing different from the reference timing, the control portion 5 changes the decoding timing to the reference timing. Then, the control portion 5 alternately changes the decoding timing between the first timing and the second timing, every time reception of the member data has been determined to have failed in step S14.

The control portion 5 may change the decoding timing in a procedure different from the above-described change procedure.

<Step S17>

In step S17, the control portion 5 determines whether or not the number of times reception of the member data has been determined to have failed in step S14, is larger than the upper limit number of times.

If the control portion 5 determines that the number of times reception of the member data has been determined to have failed in step S14, is larger than the upper limit number of times (Yes in S17), the control portion 5 advances the process to step S19. If the number of times reception of the member data has been determined to have failed in step S14, is not larger than the upper limit number of times (No in S17), the control portion 5 advances the process to step S18.

<Step S18>

In step S18, the control portion 5 retransmits the transmission request to the IC tag 8. Here, the process step of step S18 is an example of a retransmission step in the present disclosure, and is executed by the retransmission processing portion 55 of the control portion 5. Thus, using the decoding timing that has been changed in step S16, reception of the member data is executed again.

<Step S19>

In step S19, the control portion 5 provides notification regarding occurrence of a reception error. The process step of step S19 is executed by the notification processing portion 60 of the control portion 5.

For example, the control portion 5 provides the notification by displaying a message indicating the occurrence of the reception error on the operation display portion 6. Thus, a user of the image forming apparatus 10 can recognize communication abnormality between the IC tag 8 and the communication portion 9, and take a corresponding action such as replacement of the toner container 34A or remounting of the toner container 34A.

<Step S151>

On the other hand, when the control portion 5 determines in step S15 that reception of the member data has been determined to be successful in step S14, the control portion 5 executes the process step of step S151. In step S151, the control portion 5 determines whether or not the decoding timing has been changed in step S16.

If the control portion 5 determines in step S16 that the decoding timing has been changed (Yes in S151), the control portion 5 advances the process to step S152. If the decoding timing is not changed in step S16 (No in S151), the control portion 5 advances the process to step S11.

<Step S152>

In step S152, the control portion 5 sets the decoding timing to the timing used when reception of the member data is successful. The process step of step S152 is executed by the first setting processing portion 56 of the control portion 5.

For example, the control portion 5 sets the decoding timing by storing the timing used when reception of the member data is successful, in an overwriting manner in the first storage area of the EEPROM. Thus, in step S14 to be executed thereafter, the number of times reception is determined to have failed is decreased. Time spent for reading the member data from the IC tag 8 is shortened.

In the data reception process, the process steps of steps S17 and S19 may be omitted. In the data reception process, the process steps of steps S151 and S152 may be omitted. In step S16, the control portion 5 may change the decoding timing by overwriting the first storage area of the EEPROM. In this case, the process steps of steps S151 and S152 may be omitted.

[Decoding Timing Setting Process]

Figure 8:
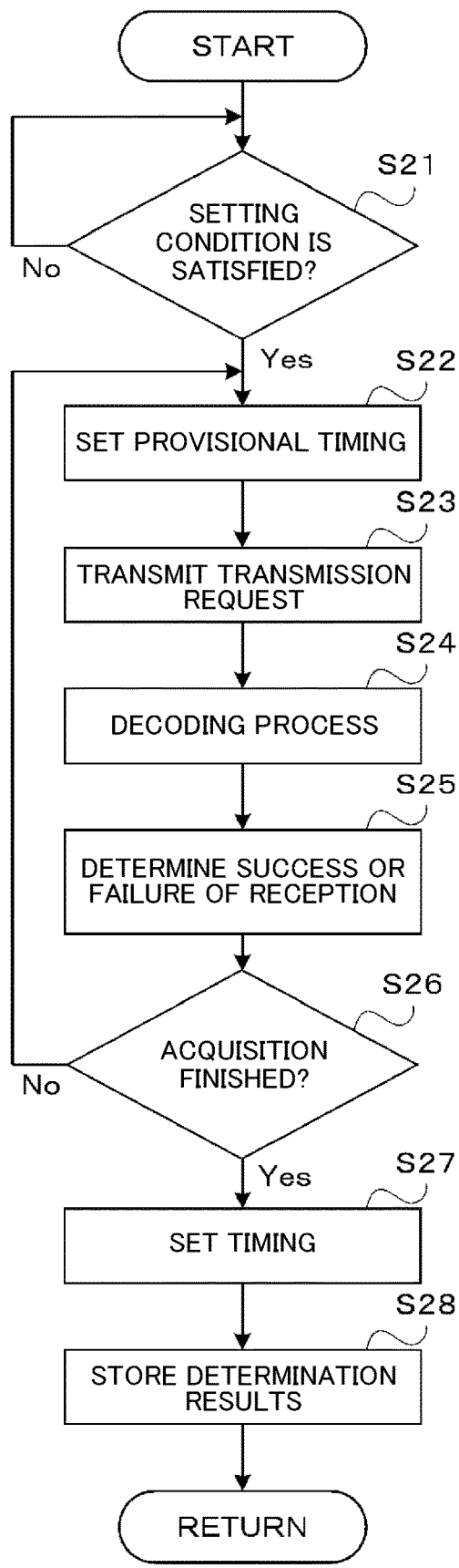
FIG. 8 is a flowchart showing an example of a decoding timing setting process executed in the image forming apparatus according to the embodiment of the present disclosure.

Next, an example of the procedure of a decoding timing setting process executed by the control portion 5 in the image forming apparatus 10 will be described with reference to FIG. 8.

<Step S21>

First, in step S21, the control portion 5 determines whether or not the setting condition has been satisfied.

For example, when the number of times reception of the member data has been determined to have failed in step S14 of the data reception process, is larger than the upper limit number of times, the control portion 5 determines that the setting condition has been satisfied. In step S19 of the data reception process, the control portion 5 may execute the process steps of steps S22 to S28 described later, instead of the notification regarding occurrence of a reception error.

If the control portion 5 determines that the setting condition has been satisfied (Yes in S21), the control portion 5 advances the process to step S22. If the setting condition is not satisfied (No in S21), the control portion 5 waits in step S21 for the setting condition to be satisfied.

<Step S22>

In step S22, the control portion 5 sets the decoding timing to any of the provisional timings.

For example, the control portion 5 sets the decoding timing to the provisional timing by storing the provisional timing in an overwriting manner in the first storage area of the EEPROM.

When the storage portion 7 stores the provisional timings that correspond to the determination results indicating successful reception, the control portion 5 sets the decoding timing to any one of the provisional timings that correspond to the determination results indicating successful reception and stored in the storage portion 7. Thus, it is possible to shorten time necessary for performing the decoding timing setting process for the second and subsequent times.

<Step S23>

In step S23, similarly as in step S12 of the data reception process, the control portion 5 transmits the transmission request to the IC tag 8, by using the antenna 91 of the communication portion 9.

<Step S24>

In step S24, similarly as in step S13 of the data reception process, the control portion 5 executes the decoding process of decoding the response signal transmitted from the IC tag 8 to the antenna 91 in response to the transmission request that has been transmitted in step S23.

<Step S25>

In step S25, similarly as in step S14 of the data reception process, the control portion 5 determines success or failure of reception of the member data, on the basis of the response signal that has been decoded in step S24. Thus, the determination result for the provisional timing that has been set in step S22 is acquired. The process steps of steps S21 to S25 are executed by the acquisition processing portion 57 of the control portion 5.

<Step S26>

In step S26, the control portion 5 determines whether or not the determination results for all the provisional timings have been acquired in step S25.

If the control portion 5 determines that the determination results for all the provisional timings have been acquired in step S25 (Yes in S26), the control portion 5 advances the process to step S27. If the determination results for all the provisional timings have not been acquired yet in step S25 (No in S26), the control portion 5 advances the process to step S22. In this case, in step S22 to be executed again, the control portion 5 sets the decoding timing to the provisional timing for which the determination result has not been acquired yet in step S25, among the provisional timings.

<Step S27>

In step S27, the control portion 5 sets the decoding timing on the basis of the provisional timing that corresponds to the determination result indicating successful reception among the determination results for the respective provisional timings, acquired in step S25. The process step of step S27 is executed by the second setting processing portion 59 of the control portion 5.

For example, the control portion 5 sets the decoding timing by storing, in an overwriting manner in the first storage area, one of the provisional timings that correspond to the determination results indicating successful reception among the determination results for the respective provisional timings, acquired in step S25. For example, when three or more provisional timings that correspond to the determination results indicating successful reception are present continuously in time, the control portion 5 stores one provisional timing that is present at a midpoint between the earliest provisional timing and the latest provisional timing, in an overwriting manner in the first storage area. Thus, the decoding timing is set to the optimum timing that corresponds to the IC tag 8, of the toner container 34A, which is mounted to the image forming portion 3.

The control portion 5 may cause the storage portion 7 to store the timing set in step S27 and the identification information that is included in the member data read from the IC tag 8, so as to be associated with each other. In this case, the control portion 5 may execute a process of setting the decoding timing from among the timings for the respective identification information pieces that are stored in the storage portion 7, on the basis of the identification information that is included in the member data read from the IC tag 8, instead of the process steps of steps S151 and S152 in the data reception process.

<Step S28>

In step S28, the control portion 5 causes the storage portion 7 to store the determination results for the respective provisional timings, acquired in step S25. The process step of step S28 is executed by the storage processing portion 58 of the control portion 5.

For example, the control portion 5 stores the acquired determination results for the respective provisional timings in an overwriting manner in the second storage area.

It is noted that the process step of step S28 in the decoding timing setting process may be omitted. In the image forming apparatus 10, the decoding timing setting process may not be executed.

As described above, in the image forming apparatus 10, when it has been determined that reception of the member data from the IC tag 8 has failed, the decoding timing of the response signal is changed and the transmission request for transmitting the member data is retransmitted to the IC tag 8. Thus, it is possible to suppress occurrence of a reception error when the member data is received from the IC tag 8 as compared to a configuration in which the decoding timing of the response signal is set in a fixed manner.

The present disclosure may be applied to an electronic apparatus other than an image forming apparatus. Specifically, the present disclosure may be applied to an electronic apparatus that includes an IC tag provided to a replacement member attachable to and detachable from the image forming apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   an antenna configured to be able to transmit and receive a radio signal;
   a wireless communication portion having a storage portion that stores member data regarding a replacement member attachable to and detachable from the image forming apparatus, the wireless communication portion being provided to the replacement member, the wireless communication portion being configured to be activated in response to radiation of a radio wave from the antenna and perform wireless communication;
   a transmission processing portion configured to transmit a transmission request for transmitting the member data to the wireless communication portion, by using the antenna;
   a decoding processing portion configured to decode, at a predetermined reference timing in a predetermined bit period, a response signal that is transmitted from the wireless communication portion to the antenna in response to the transmission request and that includes the member data and has been encoded at the predetermined bit period;
   a determination processing portion configured to determine success or failure of reception of the member data on the basis of the response signal that has been decoded by the decoding processing portion;

a change processing portion configured to change a decoding timing of the response signal to be decoded by the decoding processing portion, when the determination processing portion has determined that reception of the member data has failed; and a retransmission processing portion configured to retransmit the transmission request to the wireless communication portion when the decoding timing has been changed by the change processing portion.

2. The image forming apparatus according to claim 1, wherein the reference timing is a timing at which the bit period is divided into two equal parts, and the change processing portion alternately changes the decoding timing between a first timing that is earlier than the reference timing and a second timing that is later than the reference timing, every time the determination processing portion has determined that reception of the member data has failed.

3. The image forming apparatus according to claim 2, further comprising a first setting processing portion configured to, when the determination processing portion has determined that reception of the member data is successful after the change processing portion has changed the decoding timing, set the decoding timing to the timing used when reception of the member data is successful, wherein the decoding processing portion decodes the response signal at the decoding timing set by the first setting processing portion, until the determination processing portion determines that reception of the member data has failed since the first setting processing portion has set the decoding timing.

4. The image forming apparatus according to claim 2, further comprising a notification processing portion configured to provide notification regarding occurrence of a reception error when a number of times the determination processing portion has determined that reception of the member data has failed, is larger than a predetermined upper limit number of times.

5. The image forming apparatus according to claim 2, further comprising an image forming portion configured to form an image by using toner, wherein the replacement member is a toner containing portion that contains toner, and the member data includes identification information of the toner containing portion and toner remaining amount information in the toner containing portion.

6. The image forming apparatus according to claim 1, further comprising:

an acquisition processing portion configured to, when a predetermined setting condition is satisfied, acquire, for each predetermined provisional timing in the bit period, a determination result by the determination processing portion in a case where the decoding processing portion decodes the response signal at the provisional timing; and a second setting processing portion configured to set the decoding timing on the basis of the provisional timing that corresponds to the determination result indicating successful reception among the determination results for the respective provisional timings, acquired by the acquisition processing portion, wherein the decoding processing portion decodes the response signal at the decoding timing set by the second setting processing portion, until the determination processing portion determines that reception of the member data has failed since the second setting processing portion has set the decoding timing.

7. The image forming apparatus according to claim 6, further comprising a storage processing portion configured to cause a determination result storage portion to store the determination results for the respective provisional timings, acquired by the acquisition processing portion, wherein when the determination result storage portion stores the provisional timing that corresponds to the determination result indicating successful reception, the acquisition processing portion acquires the determination result, for each provisional timing that corresponds to the determination result indicating successful reception and stored in the determination result storage portion.

8. A communication method executed by an image forming apparatus that includes an antenna configured to be able to transmit and receive a radio signal, and a wireless communication portion having a storage portion that stores member data regarding a replacement member attachable to and detachable from the image forming apparatus, the wireless communication portion being provided to the replacement member, the wireless communication portion being configured to be activated in response to radiation of a radio wave from the antenna and perform wireless communication, the communication method comprising:

a transmission step of transmitting a transmission request for transmitting the member data to the wireless communication portion, by using the antenna;

a decoding step of decoding, at a predetermined reference timing in a predetermined bit period, a response signal that is transmitted from the wireless communication portion to the antenna in response to the transmission request and that includes the member data and has been encoded at the predetermined bit period;

a determination step of determining success or failure of reception of the member data on the basis of the response signal that has been decoded in the decoding step;

a change step of changing a decoding timing of the response signal in the decoding step, when it has been determined in the determination step that reception of the member data has failed; and a retransmission step of retransmitting the transmission request to the wireless communication portion when the decoding timing has been changed in the change step.

* * * * *